United States Patent
Navale et al.

(10) Patent No.: US 10,710,431 B2
(45) Date of Patent: Jul. 14, 2020

(54) CONTROL SYSTEM FOR A METAL HYDRIDE AIR CONDITIONER AND A METHOD THEREOF

(71) Applicant: THERMAX LIMITED, Pune (IN)

(72) Inventors: Devadatta Pundlik Navale, Pune (IN); Sachin Narayan Gunjal, Pune (IN)

(73) Assignee: THERMAX LIMITED, Maharashtra (IN)

( * ) Notice: Subject to any disclaimer, the term of this patent is extended or adjusted under 35 U.S.C. 154(b) by 109 days.

(21) Appl. No.: 16/018,749

(22) Filed: Jun. 26, 2018

(65) Prior Publication Data

US 2018/0370331 A1 Dec. 27, 2018

(30) Foreign Application Priority Data

Jun. 27, 2017 (IN) .............................. 201721022488

(51) Int. Cl.
*B60H 1/32* (2006.01)
*F25B 17/12* (2006.01)
*F25B 27/02* (2006.01)
*F25B 49/04* (2006.01)

(52) U.S. Cl.
CPC ....... *B60H 1/3201* (2013.01); *B60H 1/32014* (2019.05); *F25B 17/12* (2013.01); *F25B 27/02* (2013.01); *F25B 49/043* (2013.01); *B60H 2001/3255* (2013.01); *B60H 2001/3266* (2013.01); *F25B 2600/01* (2013.01); *F25B 2600/23* (2013.01)

(58) Field of Classification Search
CPC .............. B60H 1/3201; B60H 1/32014; B60H 2001/3255; B60H 2001/3266; F25B 17/02; F25B 27/02; F25B 49/043; F25B 2600/01; F25B 2600/23
See application file for complete search history.

(56) References Cited

U.S. PATENT DOCUMENTS

| | | | | |
|---|---|---|---|---|
| 4,436,539 | A | * | 3/1984 | Ron ..................... B60H 1/3201 62/4 |
| 2015/0316300 | A1 | * | 11/2015 | Burger .................... F25B 17/08 62/101 |
| 2018/0031284 | A1 | * | 2/2018 | Navale .................... F25B 17/12 |
| 2018/0164000 | A1 | * | 6/2018 | Navale .............. B60H 1/00899 |
| 2019/0170044 | A1 | * | 6/2019 | Navale .................... F01N 11/00 |

\* cited by examiner

*Primary Examiner* — Marc E Norman
(74) *Attorney, Agent, or Firm* — Cowan, Liebowitz & Latman, P.C.; Mark Montague

(57) ABSTRACT

A control system as disclosed in the present disclosure relates to the field of metal hydride air conditioning systems in vehicles. The control system improves cooling capacity and the coefficient of performance of the metal hydride air conditioner. The control system comprises a plurality of sensors, a memory, a time counter, a controller, and at least one actuator. The controller takes into account the pre-set half cycle time as well as the temperature of the exhaust gases at the outlet of a HT or LT reactor for changing fluid flow, i.e. from hot/cold fluid to the fluid at ambient temperature or vice versa, entering the reactors of the metal hydride air conditioner.

14 Claims, 13 Drawing Sheets

CONTROL SYSTEM FOR A METAL HYDRIDE AIR CONDITIONER AND A METHOD THEREOF

CROSS-REFERENCE TO RELATED APPLICATION

This application claims priority of Indian Application No. 201721022488 filed Jun. 27, 2017, which is incorporated herein by reference.

FIELD

The present disclosure relates to the field of control systems. Particularly, the present disclosure relates to the field of control systems for metal hydride air conditioning systems.

BACKGROUND

A metal hydride air conditioner is predominantly used in vehicles due to its energy efficient operation. Conventionally, a metal hydride air conditioner includes a high temperature (HT) reactor and a low temperature (LT) reactor. Hydrogen transfer takes place between the HT reactor and the LT reactor. A particular working cycle of each of the HT and the LT reactor includes two half cycles. The initiation of a new half cycle requires changing the flow from the hot/cold fluid to the fluid at ambient temperature or vice versa. For example, the HT reactor receives the hot fluid in the first half cycle and the fluid at ambient temperature in the second half cycle. Similarly, the LT reactor receives the fluid at ambient temperature in the first half cycle, and the cold fluid in the second half cycle. Typically, exhaust gas from the engine of the vehicle is used as the hot fluid. In conventional metal hydride air conditioners, changing the flow, i.e. from hot/cold fluid to the fluid at ambient temperature or vice versa, is purely dependent on fixed pre-set time. However, quantity and temperature of the hot fluid, i.e., exhaust gas, keeps on varying due to many parameters such as road conditions, inclination of the road, and vehicle speed. If the flow and the temperature of exhaust gas to be supplied are higher, the first half cycle of HT reactor may complete before the fixed half cycle time. However, switching of flow in the conventional metal hydride air conditioners is not dependent on the flow and quantity of the exhaust gas. In such cases, higher flow and the temperature of exhaust gas may result in lower coefficient of performance as next half cycle is not initiated in the metal hydride air conditioner.

Therefore, there is felt a need of a control system for a metal hydride air conditioner, that alleviates the abovementioned drawbacks of conventional metal hydride air conditioners and takes into account the fixed cycle time as well as the flow and quantity of exhaust gas for switching the flow.

OBJECTS

Some of the objects of the present disclosure, which at least one embodiment herein satisfies, are as follows:

An object of the present disclosure is to provide a control system that improves the cooling capacity and coefficient of performance of a metal hydride air conditioner.

Another object of the present disclosure is to provide a control system for a metal hydride air conditioner that optimally changes the flow of various fluids to be supplied in reactors of the metal hydride air conditioner.

Other objects and advantages of the present disclosure will be more apparent from the following description, which is not intended to limit the scope of the present disclosure.

SUMMARY

The present disclosure envisages a control system for a metal hydride air conditioner. The system comprises a plurality of sensors, a memory, and a time counter. The plurality of sensors are configured to periodically sense temperature of an exhaust gas at an outlet of each of a plurality of reactors of the hydride air conditioner, and generate a current outlet temperature value at each of pre-defined time intervals for each of the rectors. The memory is configured to store a pre-set outlet temperature value for each of the reactors and a pre-set half cycle time value for each of the reactors. In an embodiment, the memory is configured to store a pre-set half cycle time lower limit value and a pre-set half cycle time upper limit value. The time counter is configured to increase a current time count value at each of the pre-defined time intervals immediately after switching on of the metal hydride air conditioner. The controller cooperates with the plurality of sensors, the memory, and the time counter.

The controller includes at least one comparator and at least one timer.

In an embodiment, the controller is configured to read the pre-set outlet temperature value, and the pre-set half cycle time value from the memory, and iteratively receive the current outlet temperature value, and the current time count value. The controller is further configured to compare the pre-set outlet temperature value with the current outlet temperature value at each of the pre-defined time intervals using the at least one comparator, and set a first flag signal when the current outlet temperature value is greater than or equal to the pre-set outlet temperature value. The controller concurrently activates and increments the at least one timer, at each of the pre-defined time intervals, when the metal hydride air conditioner is switched on, and generate a first time value at the time instance when the first flag is set. Further, the controller compares, at each of the pre-defined time intervals using the at least one comparator, the pre-set half cycle time value and the first time value to determine the minimum value between the pre-set half cycle time value and the first time value, and activates the at least one actuator at the first time value when the first time value is smaller than the pre-set half cycle time value, or at the pre-set half cycle time value.

In another embodiment, the controller reads the pre-set outlet temperature value, the pre-set half cycle time lower limit value and the pre-set half cycle time upper limit value from the memory. The controller iteratively receives the current outlet temperature value, and the current time count value. Further, the controller compares, using the at least one comparator, the pre-set outlet temperature value with the current outlet temperature value, at each of the pre-defined time intervals, and sets a second flag signal when the current outlet temperature value is equal to the pre-set outlet temperature value. The controller concurrently activates and increments the at least one timer, at each of the pre-defined time intervals, when the metal hydride air conditioner is switched on, and generate a second time value at the time instance when the second flag is set. Furthermore, the controller compares, at each of the pre-defined time intervals using the at least one comparator (510), the pre-set half cycle time lower limit value, the pre-set half cycle time upper limit value, the current time count value, and the second time value. The controller enters in a wait state when:
- the current time count value is greater than or equal to the pre-set half cycle time lower limit value and the current time count value is smaller than the second time value or the pre-set half cycle time upper limit value; or
- the current time count value is greater than or equal to the first time value and the current time count value is smaller than the pre-set half cycle time lower limit value.

The controller is configured to activate the at least one actuator when:
- the current time count value equals to either the second time value or the pre-set half cycle time upper limit value; or
- the current time count value is greater than or equal to the second time value and equals to the pre-set half cycle time lower limit value.

The present disclosure also envisages a method for controlling actuation of at least one actuator associated with each of the reactors of a metal hydride air conditioner.

BRIEF DESCRIPTION OF THE ACCOMPANYING DRAWING

A control system for a metal hydride air conditioner, of the present disclosure, will now be described with the help of the accompanying drawing, in which.

Figure 9A:
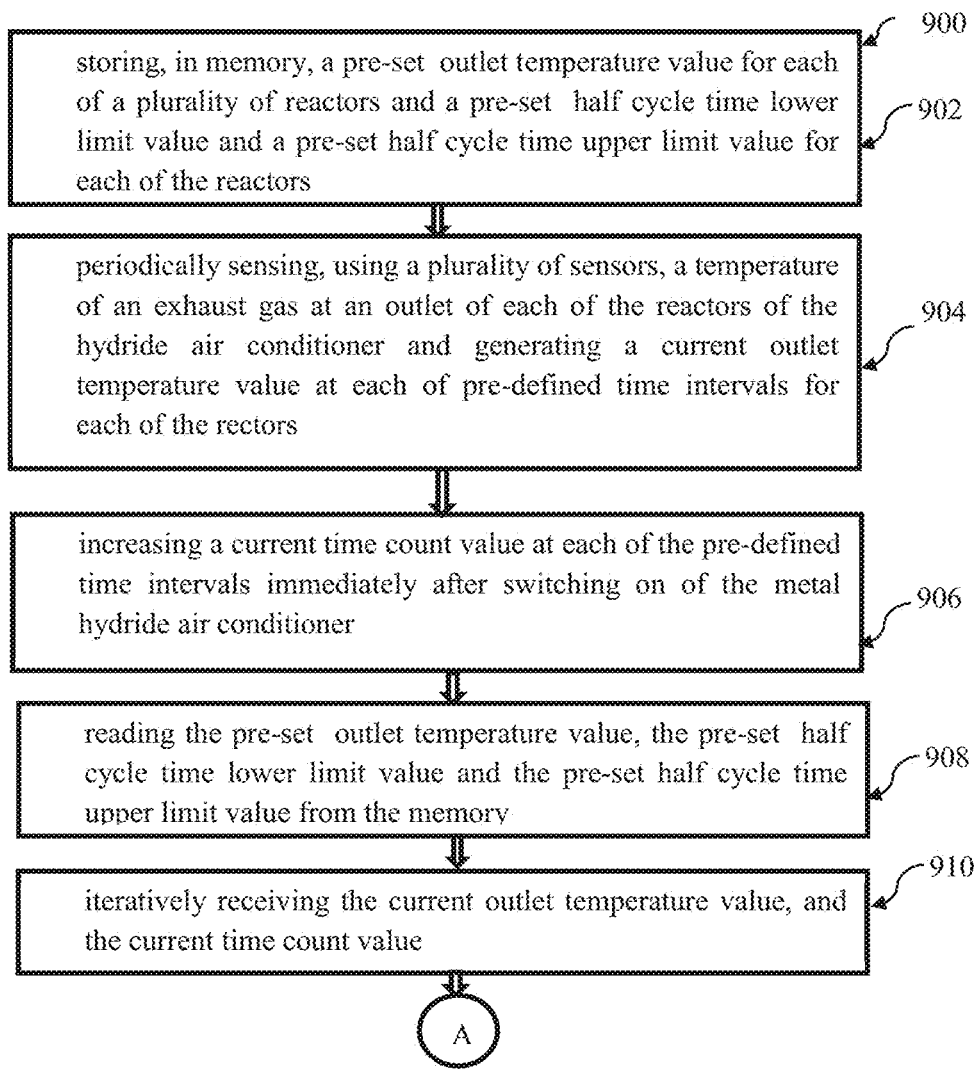
Figure 9B:
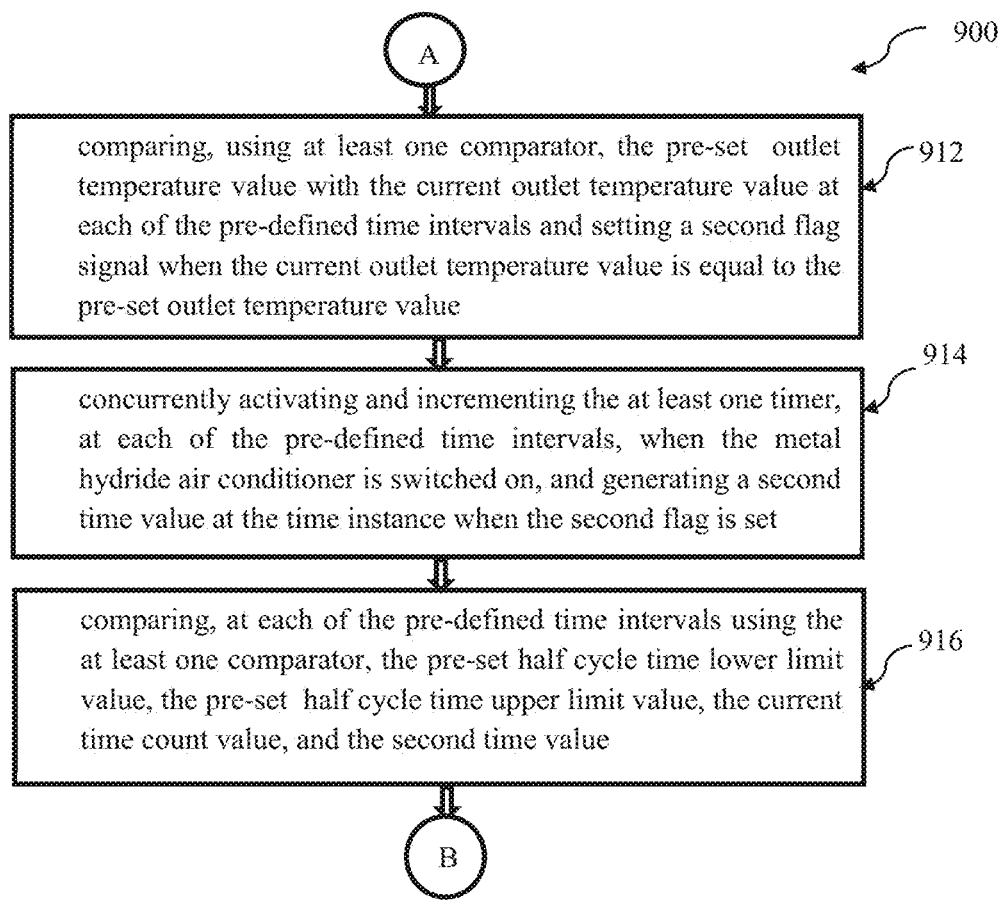
Figure 9C:
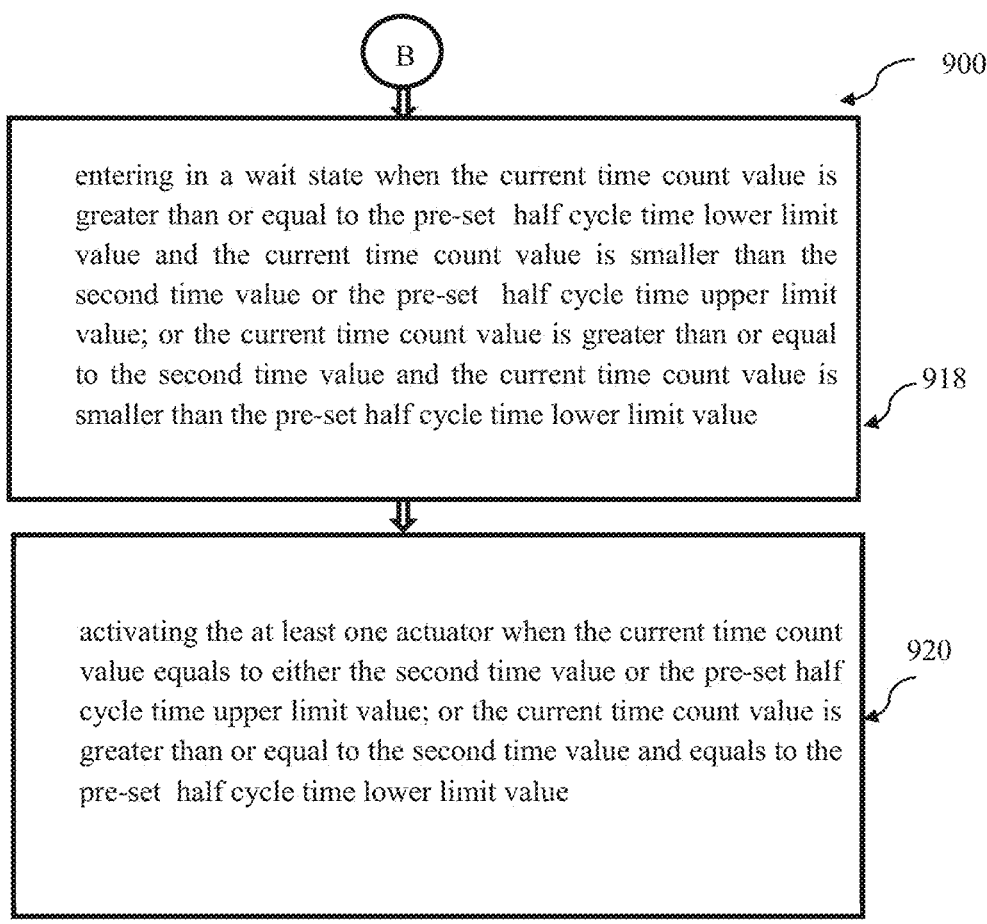
Figure 10:
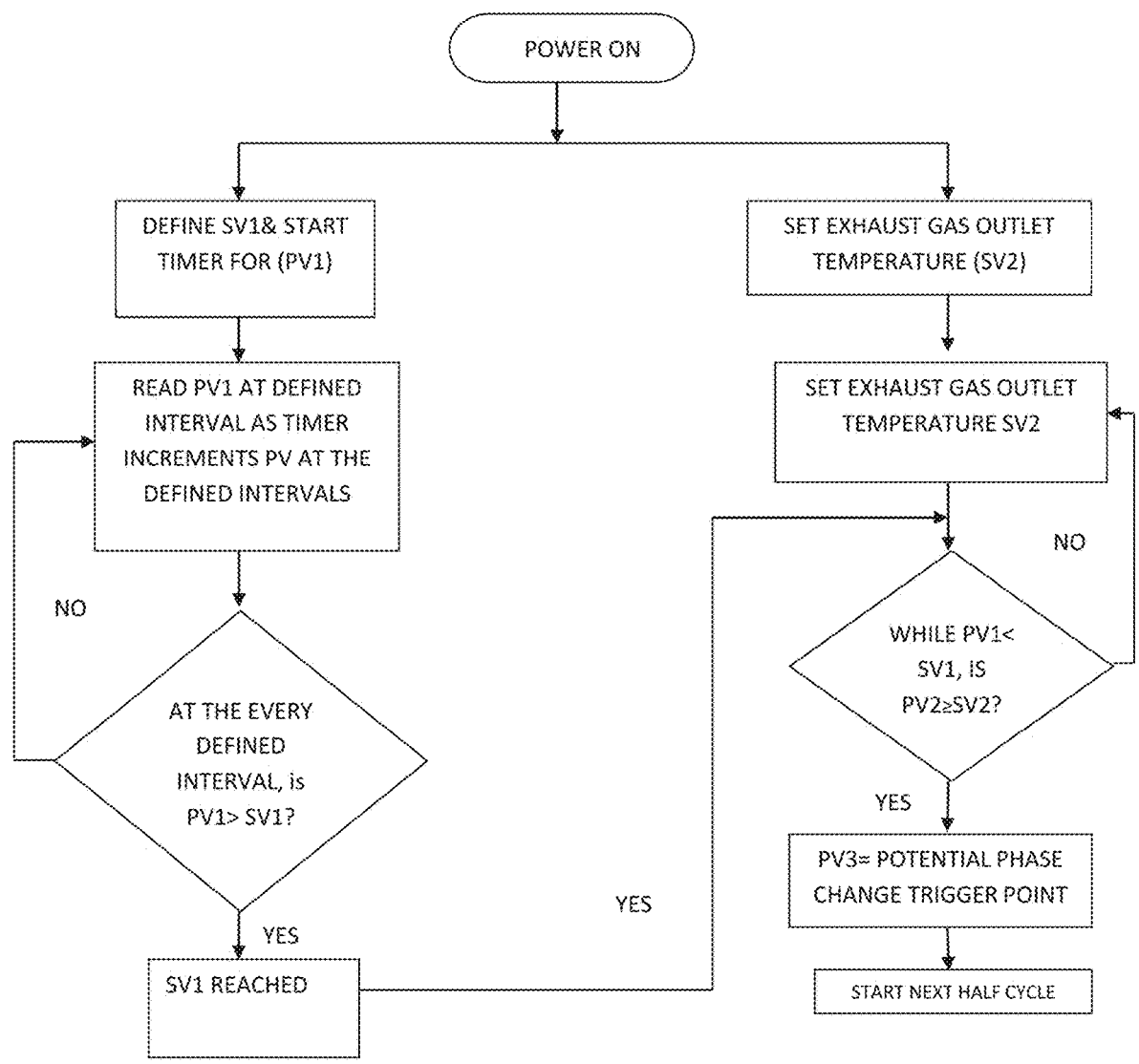
Figure 11:
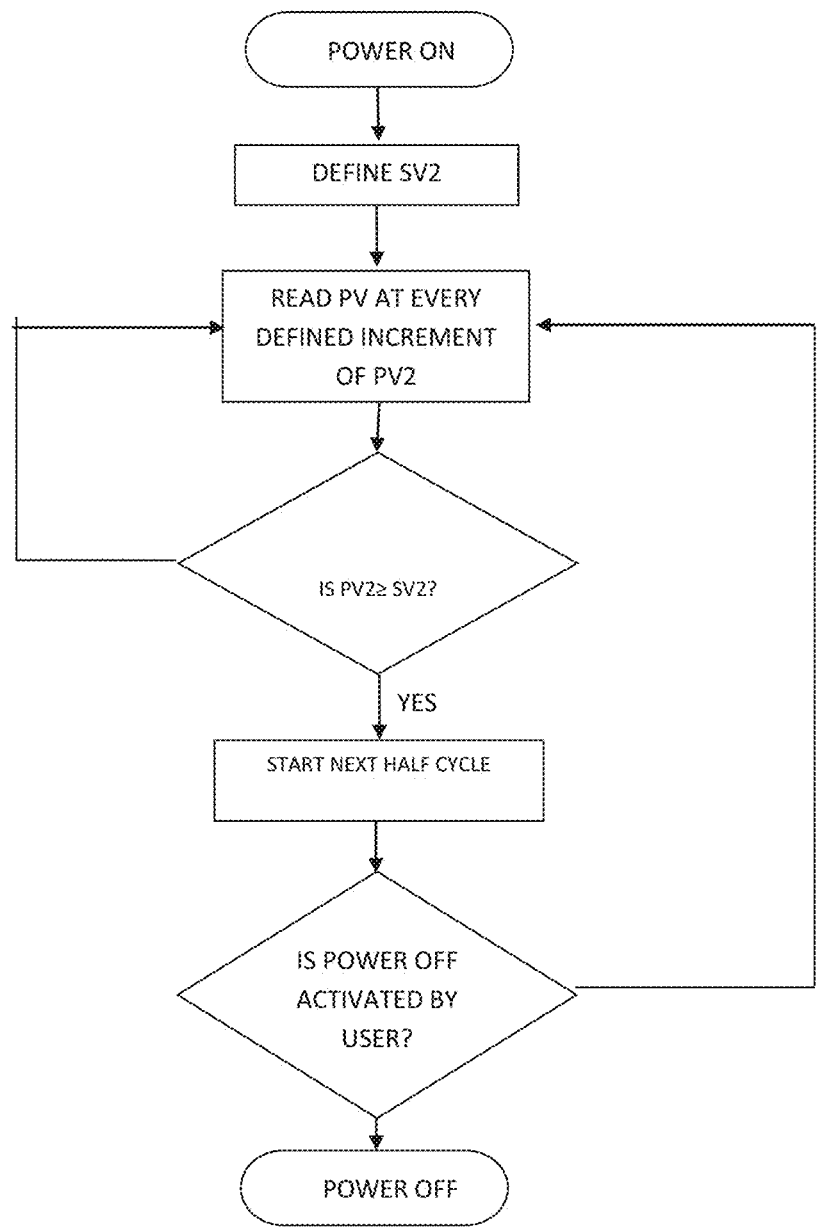

FIGS. 9A, 9B and 9C illustrate a flow diagram of a method for controlling actuation of at least one actuator associated with each of a plurality of reactors of a metal hydride air conditioner in accordance with third embodiment of the present disclosure; and FIG. 10 illustrates a flow chart depicting the method in accordance with the first embodiment of the present disclosure; and FIG. 11 illustrates a flow chart depicting the method in accordance with the second embodiment of the present disclosure.

LIST OF REFERRAL NUMERALS

500—Control system
502—Controller
504—Plurality of sensors
506—Memory
508—Time counter
510—Comparator
512—Timer
514—First actuator
516—Second actuator
PV1—Current time count value
PV2—Current outlet temperature value
PV3—First time value
SV1—Pre-set half cycle time value
SV1a—Pre-set half cycle time lower limit value
SV1b—Pre-set half cycle time upper limit value
SV2—Pre-set outlet temperature value

DETAILED DESCRIPTION

A metal hydride air conditioner is predominantly used in vehicles due to its energy efficient operation. A heating cycle and a cooling cycle in the metal hydride heat air conditioner occur depending upon the heat migration associated with absorption or desorption of hydrogen gas. Conventionally, a metal hydride air conditioner includes a high temperature (hereinafter referred as HT) reactor and a low temperature (hereinafter referred as LT) reactor. The HT reactor absorbs hydrogen at ambient temperatures and desorbs at higher temperatures, whereas the LT reactor absorbs hydrogen at ambient temperature and desorbs at lower temperature. A particular working cycle of the HT and LT reactors includes two half cycles, wherein initiation of a new half cycle requires changing the flow to the HT or LT reactors from hot/cold fluid to a fluid at ambient temperature or vice versa. For example, for the first half cycle, the HT reactor receives the hot fluid, and at the other half cycle, it receives fluid at ambient temperature. Similarly, the LT reactor is configured to alternatively receive the fluid at ambient temperature and cold fluid. Typically, in a metal hydride air conditioner, a pair of LT reactors and a pair of HT reactors are used. Each LT reactor is coupled with each HT reactor for transfer of hydrogen there between. Generally, the hot fluid required in metal hydride air conditioners in vehicles is preferably the exhaust gas released by the engine.

In conventional metal hydride air conditioners, changing the flow is purely based on pre-set fixed half cycle time. Therefore, initiation of a new half cycle is based on the pre-set fixed half cycle time. However, the flow and the quantity of the exhaust gas keeps on changing due to many parameters such as road conditions, inclination of the road, and vehicle speed. In case of a vehicle moving uphill the road, the flow and temperature of the exhaust gas is much higher as compared to that of a vehicle moving on a plane road. In such a case, if a new half cycle in a metal hydride air conditioner is initiated based on the fixed cycle time, the air conditioner may fail due to its operation at higher pressure and temperature. Further, cooling capacity of the air conditioner is reduced as the hot fluid is transferred in less time before initiating new half cycle. Therefore, the required half cycle time is lower than the fixed cycle time. In case of a vehicle moving downhill the road, the flow and temperature of the exhaust gas are much lower. In such a case, if a new half cycle in a metal hydride air conditioner is initiated based on the fixed cycle time, the fluid transferred during the given cycle time period is much lower than the required flow, thereby lowering the cooling capacity and the coefficient of performance of the air conditioner. In this case, the required cycle time is higher than the fixed cycle time.

Figure 1:
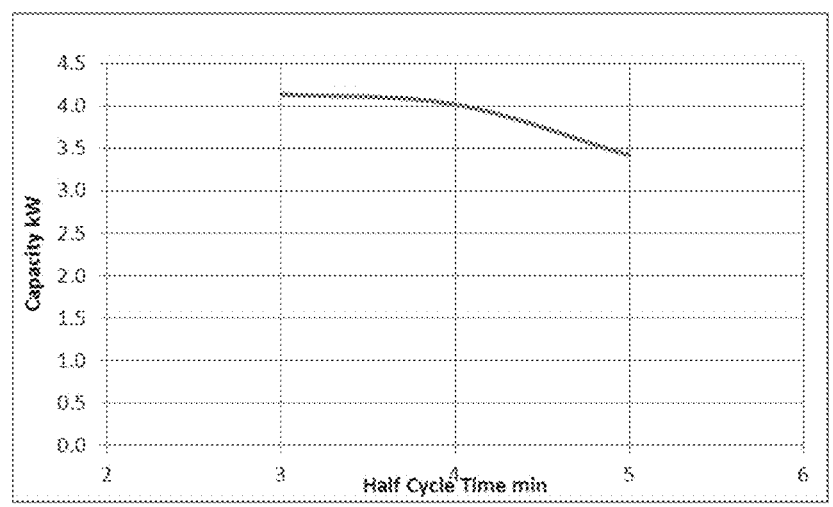
FIG. 1 illustrates a graphical representation depicting variation of cooling capacity with respect to half cycle time at varying heat input.

Table 1 and FIG. 1 depict variation of cooling capacity with respect to half cycle time at varying heat input.

TABLE 1

Cooling capacity as a function of time at varying heat input

| Cycle Time Min | Capacity kW |
|---|---|
| 3 | 4.14 |
| 4 | 4.02 |
| 5 | 3.42 |

Examples of fixed half cycle time, i.e., 3 minutes, 4 minutes, and 5 minutes, are considered. If a sufficient heat input for a particular half cycle is available, then the 3 minute half cycle time has better cooling capacity compared to the 4 minutes and 5 minutes half cycles. This is because the rate of hydrogen transfer between the HT and the LT decreases with time as the system reaches towards equilibrium. However, even in the 3 minute half cycle, if the required heat content is received before 3 minutes, the cooling capacity reduces or begins to deteriorate for the period after the time when the required heat content is received.

Figure 2:
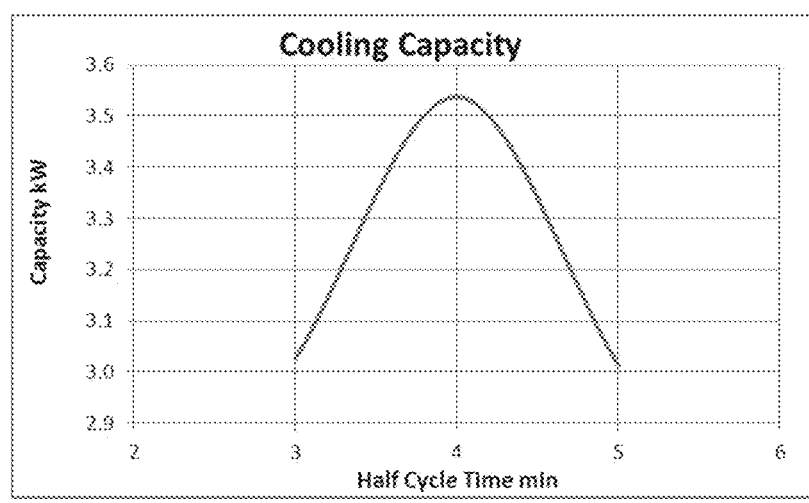
FIG. 2 illustrates a graphical representation depicting variation of cooling capacity with respect to half cycle time at constant heat input.

Table 2 and FIG. 2 depict variation of cooling capacity with respect to half cycle time at constant heat input.

TABLE 2

Cooling capacity as a function of time at constant heat input

| Cycle Time Min | Capacity kW |
|---|---|
| 3 | 3.03 |
| 4 | 3.54 |
| 5 | 3.01 |

It can be observed from table 2 and FIG. 2 that the cooling capacity rises from 3.03 kW to 3.54 kW for a variation from a 3 minutes to 4 minutes half cycle time, and again reduces to 3.01 kW for a variation from 4 minutes to 5 minutes half cycle time. This is because, for this heat input, hydrogen is not being transferred between HT and LT optimally beyond a cycle time of 4 minutes. The cooling in 3 minutes half cycle does not provide the best cooling because the rate of hydrogen transfer therein has not reached the optimum level as the heat received in the HT unit is not enough to achieve the required rate of hydrogen desorption. For the same heat input, hydrogen deficit is recovered in the next 1 minute as the HT unit receives more heat. Hence, the cooling capacity is more for 4 minutes half cycle time. In the 5 minutes half cycle time, the cooling capacity reduces. The rate of hydrogen desorption decreases as the system reaches towards equilibrium. As no heat addition or rejection is created in this cycle, there is heat loss. Hence, the cooling capacity reduces for the 5 minutes half cycle.

Figure 3:
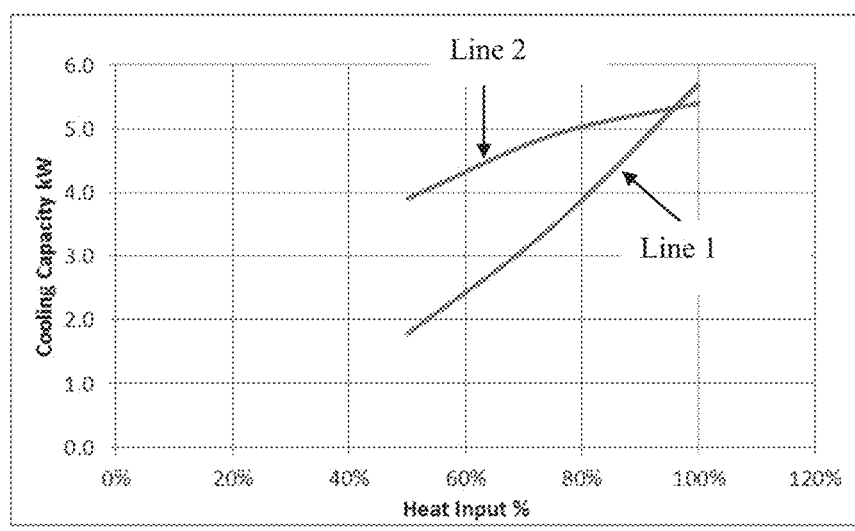
FIG. 3 illustrates a graphical representation depicting variation of cooling capacity with respect to heat input at fixed half cycle time and at dynamic half cycle time.

Table 3 and FIG. 3 depict variation of cooling capacity with respect to heat input at fixed half cycle time and at dynamic half cycle time. Dynamic half cycle involves initiation of a new half cycle based on the fixed cycle time as well as the flow and temperature of exhaust gases.

TABLE 3

Cooling capacity Comparison for fixed and dynamic control

| Heat input | Fixed HCT, 3 min Capacity | Dynamic HCT | HCT for Dynamic |
|---|---|---|---|
| % | kW | kW | cycle |
| 100% | 5.70 | 5.4 | 3:00 |
| 75% | 3.47 | 4.9 | 4:30 |
| 50% | 1.78 | 3.9 | 6:50 |

Considering the data for 3 minutes half cycle time, fixed half cycle time data (Line 1) clearly shows that the cooling capacity drastically reduces with lower heat input. This is because the hydrogen transferred reduces with reduction in heat input as the half cycle time is fixed, and hence the cooling capacity also reduces. For dynamic control (Line 2), the cooling capacity reduces with lower heat input; however the reduction is lower than the fixed cycle time. This is because, as the incoming heat is reduced the cycle time rises accordingly due to which the hydrogen transfer in the reactors is higher resulting in increased capacity.

Figure 4:
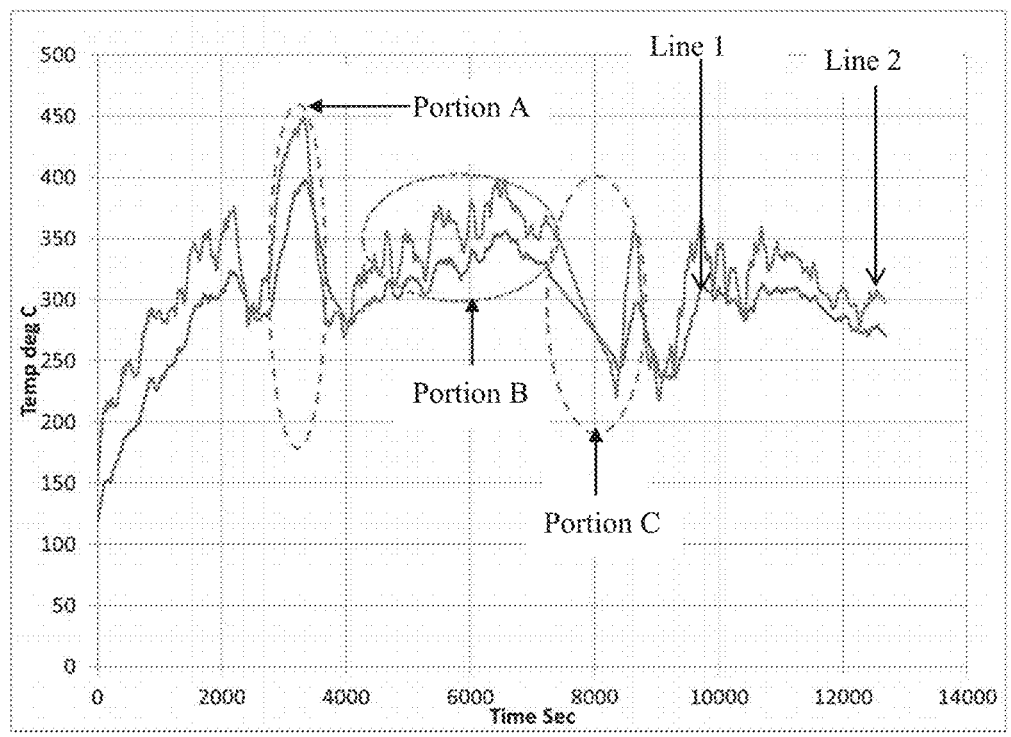
FIG. 4 illustrates a graphical representation depicting variation of temperature of exhaust gas at inlet of a metal hydride air conditioner and at outlet of a silencer.

FIG. 4 illustrates a graphical representation depicting variation of temperature of exhaust gas at inlet of the metal hydride air conditioner and at outlet of a silencer. Line 1 depicts temperature of exhaust gases at inlet of a metal hydride air conditioner, and line 2 depicts temperature of exhaust gases at the outlet of a tailpipe of a silencer of a vehicle. Portion A shows high heat input region. Portion B depicts normal running region. Portion C shows low heat input region. It can be seen that the heat available from the exhaust gases is not constant throughout the vehicle running. The heat available is lower at the initial running and further rises gradually. The heat available is maximum when there is high load, for example, when the vehicle is moving in steep ascent road (Portion A).

In straight road conditions, the heat available remains fairly constant.

From FIGS. 1 to 4, it is clear that the cooling capacity of a metal hydride air conditioner is a function of both cycle time and heat input.

The present disclosure envisages a control system for a metal hydride air conditioner that takes into account a pre-set half cycle time as well as flow and temperature of the exhaust gas to be supplied to HT and LT reactors of the metal hydride air conditioner while initiating new half cycle therein.

In an embodiment, the rate of desorption of hydrogen for varying heat inputs may reach the saturation point i.e. the heat required content by the reactor (determined by temperature of the exhaust gas at outlet), before the pre-set cycle time. In such case, the next half cycle is immediately initiated by the control system instead of waiting for the pre-defined fixed half cycle time. Thus, here the initiation of a new half cycle by the control system is solely based on the temperature of the exhaust gas at the outlet of the reactor. If the required temperature is not reached, the next half cycle is not initiated. In another embodiment of the present disclosure, the control system initiates the new half cycle considering both fixed cycle time as well as the temperature at the exhaust gas outlet. If the required temperature is reached before the fixed cycle time, then the new half cycle is initiated at the time when the required temperature is achieved. If the temperature is not reached before the fixed half cycle time, then the next half cycle is initiated after at the fixed half cycle time.

Figure 5:
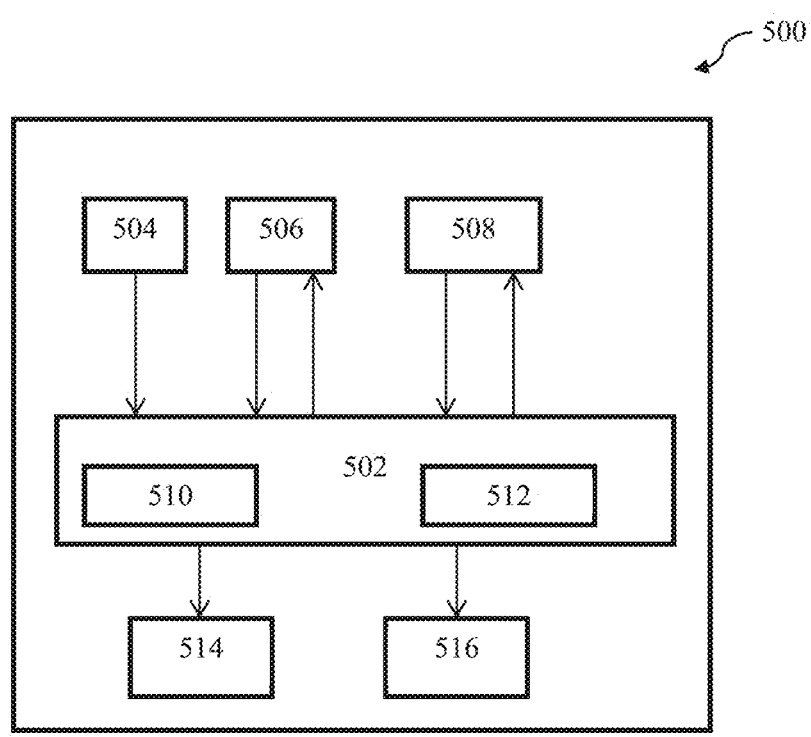
FIG. 5 illustrates a block diagram of a control system, in accordance with an embodiment of the present disclosure.

The control system, of the present disclosure, is now described with reference to FIG. 5. FIG. 5 illustrates a block diagram of a control system 500, in accordance with an embodiment of the present disclosure.

The control system 500 for a metal hydride air conditioner comprises a plurality of sensors 504, a memory 506, a time counter 508, a controller 502, and at least one actuator.

The metal hydride air conditioner includes a plurality of reactors. More specifically, the metal hydride air conditioner includes a high temperature (HT) reactor (not shown in figures) and a low temperature (LT) reactor (not shown in figures). The HT reactor is configured to receive a first fluid at ambient temperature or a hot fluid during the duration of a half-cycle of said high temperature reactor. The LT reactor is configured to receive the first fluid or a cold fluid during the duration of a half-cycle of said low temperature reactor. Further, the control system 500 comprises two actuators, i.e., a first actuator 514 and a second actuator 516. The first actuator 514 is associated with the HT reactor, and is configured to direct a flow of the first fluid (at ambient temperature) or the hot fluid towards the high temperature reactor. The second actuator is associated with the LT reactor, and is configured to direct a flow of the first fluid (at ambient temperature) or the cold fluid towards the LT reactor. The change in flow initiates next half cycle of the HT or LT reactor.

In an embodiment, the first actuator 514 and the second actuator 516 are selected from the group comprising of an electro-mechanical switch, a valve, a damper, a flap, and a motor.

The plurality of sensors 504 is configured to periodically sense a temperature of an exhaust gas at an outlet of each of the HT and LT reactors of the hydride air conditioner, and generate a current outlet temperature value (hereinafter referred as PV2) at each of pre-set time intervals for each of the reactors. The memory 506 is configured to store a pre-set outlet temperature value (hereinafter referred as SV2) for each of the reactors and a pre-set half cycle time value (SV1) for each of the reactors.

In an embodiment, the memory 506 is configured to store a pre-set half cycle time lower limit value (SV1a) for each of the reactors, and a pre-set half cycle time upper limit value (SV1b) for each of the reactors.

The pre-set outlet temperature value is configurable, and can be altered as required. Further, the pre-set half cycle time value (SV1), the pre-set half cycle time lower limit value (SV1a), and the pre-set half cycle time upper limit value (SV1b) are also configurable, and can be altered as required.

A time counter 508 is configured to increase a current time count value at each of the pre-defined time intervals immediately after switching on of the metal hydride air conditioner. The time counter 508 is configured to generate a current time count value (PV1) at each of the pre-set time intervals. In an embodiment, the time counter 508 is configured to generate the current time count value at every second or every minute. In another embodiment, the time counter 508 is configured to generate the current time count value at pre-set time interval.

The controller 502 cooperates with the plurality of sensors 504, the memory 506, and the time counter 508. The controller 502 is configured to iteratively receive the current outlet temperature value (PV2) from the plurality of sensors 504, and the current time count value (PV1) from the time counter 508. The controller 502 is further configured to receive the pre-set outlet temperature value and the pre-set half cycle time value (SV1) from the memory 506. The controller 502 is further configured to control at least one actuator (514 or 516) associated with the reactors of the metal hydride unit based on the current outlet temperature value (PV2), the pre-set outlet temperature value (SV2), the pre-set half cycle time (SV1), and the current time count value (PV1) to alter the current outlet temperature for each of the reactors, if required.

In an embodiment, the controller 502 is selected from the group comprising at least one of a processor, a microcontroller, a microprocessor, an application specific integrated circuit (ASIC), a Field Programmable Gate Array (FPGA) integrated circuit, and a Reduced Instruction Set Computing (RISC) integrated circuit, and any combination thereof.

In an embodiment, the controller 502 includes at least one comparator 510 and at least one timer 512. The comparator 510 can be implemented using at least one combinational (or at least one combinational and at least one sequential) logic circuit embedded as part of the controller 502. Further, the controller 502 may incorporate an internal memory, a control unit, peripherals and I/O interfaces (not shown in figures).

In another embodiment, the time counter 508 is synchronized with the at least one timer 512.

The comparator 510 is configured to compare the pre-set outlet temperature value (SV2) with the current outlet temperature value (PV2) at each of the predefined time intervals. The predefined time intervals are in milliseconds, seconds, or minutes. The controller 502 is configured to set a first flag signal (i.e. first flag signal='1') when the current outlet temperature value (PV2) is greater than or equal to the pre-set outlet temperature value (SV2). The controller 502 concurrently activates the timer 512, and increases the count in the timer 512 at each of the predefined time intervals when the metal hydride air conditioner is switched on. The controller 502 generates a first time value (hereinafter referred as PV3) when the first flag is set.

In accordance with first embodiment of the present disclosure, the controller 502 compares, using the at least one comparator 510, at each of the pre-defined time intervals, the pre-set half cycle time value (SV1) and the first time value (PV3) to determine the minimum value between the pre-set half cycle time value (SV1) and the first time value (PV3). The controller 502 then activates the at least one actuator 514 or 516 at the first time value (PV3) when the first time value (PV3) is smaller than the pre-set half cycle time value (SV1), or activates the at least one actuator (514 or 516) at the pre-set half cycle time value if the first flag is not set before the pre-set half cycle time value (SV1).

Therefore, the controller 502 activates the actuators based on both the outlet temperature values of exhaust gases and the pre-set half cycle time value (SV1). If the outlet temperature values of exhaust gases exceed the pre-set outlet temperature value (SV2), the actuators 514, 516 initiates the next half cycle despite of whether the pre-set half cycle time value (SV1) has elapsed or not. Similarly, if the outlet temperature values of exhaust gases does not exceed the pre-set outlet temperature value (SV2), the actuators 514, 516 initiates the next half cycle when the pre-set half cycle time value (SV1) elapses. Hence, the actuators 514, 516 are dynamically controlled based on both the pre-set cycle time values and the outlet temperature value of the exhaust gases.

In accordance with second embodiment of the present disclosure, the control system 500 actuates the at least one actuator 514 or 516 to alter the current outlet temperature value (PV2) based only on the current outlet temperature value (PV2). The controller 502 is configured to read the pre-set outlet temperature value (SV2) from the memory 506. Further, the controller 502 iteratively receives the current outlet temperature value (PV2) from the plurality of sensors 504. The controller 502 controls the at least one actuator 514 or 516 on the basis of the current outlet temperature value (PV2), and the pre-set outlet temperature value (SV2). The controller 502 compares the pre-set outlet temperature value (SV2) with the current outlet temperature value (PV2) using the at least one comparator 510 at each of the pre-defined time intervals. Further, the controller 502 activates the at least one actuator 514 or 516 when the current outlet temperature value (PV2) is greater than or equal to the pre-set outlet temperature value (SV2). Thus, the actuation is independent of the pre-set half cycle time value.

In third embodiment, the controller 502 reads the pre-set outlet temperature value (SV2), the pre-set half cycle time lower limit value (SV1a) and the pre-set half cycle time upper limit value (SV1b) from the memory. The controller 502 iteratively receives the current outlet temperature value (PV2), and the current time count value (PV1). The controller 502 compares the pre-set outlet temperature value with the current outlet temperature value at each of the pre-defined time intervals using the at least one comparator 510, and sets a second flag signal when the current outlet temperature value is equal to the pre-set outlet temperature value. The controller 502 concurrently activates and increments the at least one timer 512, at each of the pre-defined time intervals, when the metal hydride air conditioner is switched on, and generate a second time value at the time instance when the second flag is set.

The controller 502 compares the pre-set half cycle time lower limit value (SV1a), the pre-set half cycle time upper limit value (SV1b), the current time count value (PV1), and the second time value at each of the pre-defined time intervals using the at least one comparator 510. The controller 502 enters in a wait when:
  the current time count value (PV1) is greater than or equal to the pre-set half cycle time lower limit value (SV1a) and the current time count value (PV1) is smaller than the second time value or the pre-set half cycle time upper limit value (SV1b); or
  the current time count value (PV1) is greater than or equal to the second time value and the current time count value (PV1) is smaller than the pre-set half cycle time lower limit value (SV1a).

The controller 502 further activates the at least one actuator (514 OR 516) when:
  the current time count value (PV1) equals to either the second time value or the pre-set half cycle time upper limit value (SV1b); or
  the current time count value (PV1) is greater than or equal to the second time value and equals to the pre-set half cycle time lower limit value (SV1a) to alter the current outlet temperature for each of the reactors, if required.

The present disclosure also envisages a method for controlling actuation of at least one actuator associated with each of the reactors of a metal hydride air conditioner. The method may be described in the general context of computer executable instructions. The method may be implemented in any suitable hardware, software, firmware, or any combination thereof.

Figure 6:
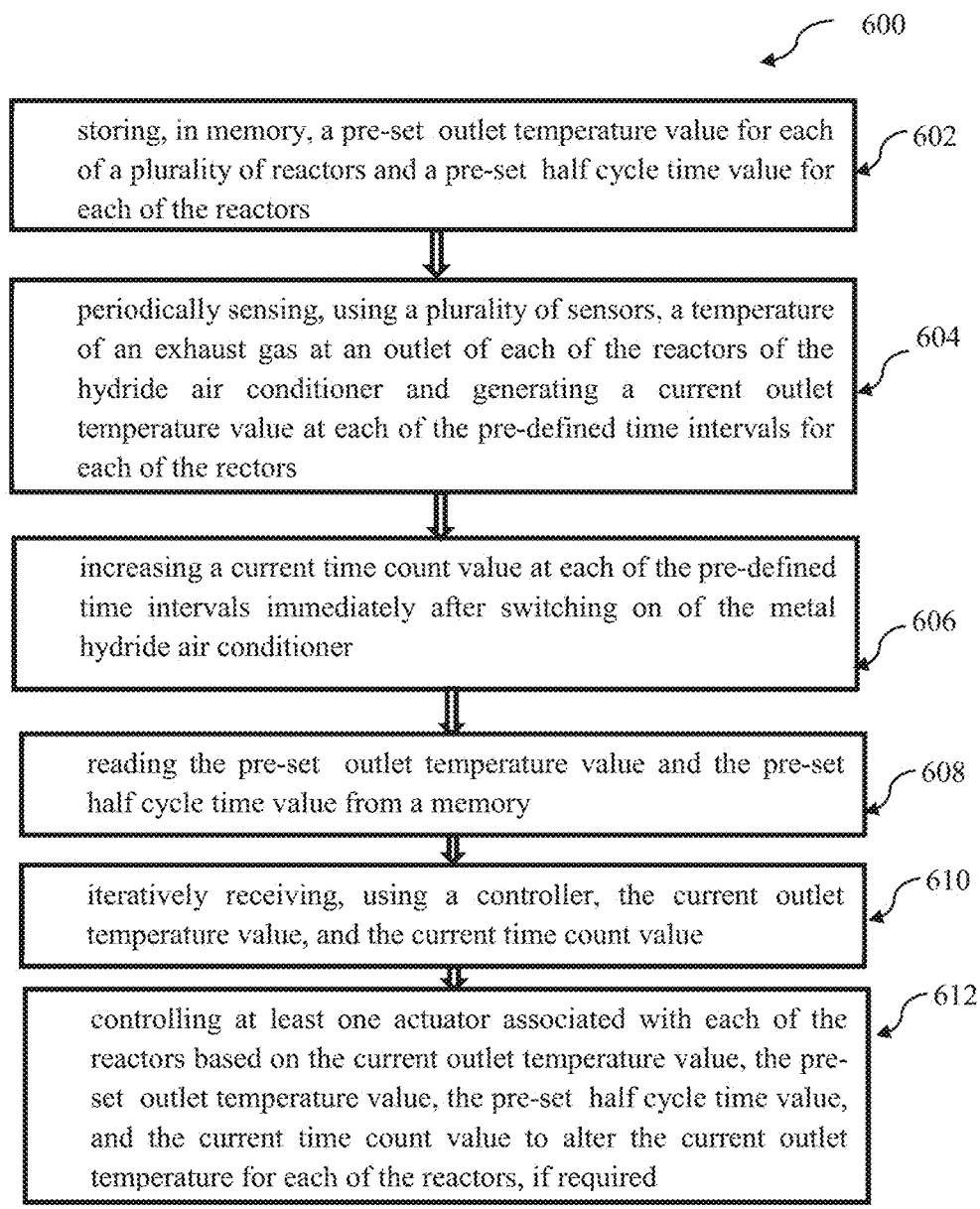
FIG. 6 illustrates a flow diagram of a method for controlling actuation of at least one actuator associated with each of a plurality of reactors of a metal hydride air conditioner in accordance with first embodiment of the present disclosure.

FIG. 6 illustrates a method 600 for controlling actuation of at least one actuator associated with each of the reactors of a metal hydride air conditioner in accordance with first embodiment of the present disclosure. FIG. 10 illustrates a flow chart depicting the method in accordance with the first embodiment of the present disclosure.

At block (step) 602, the method 600 includes storing, in memory 506, a pre-set outlet temperature value for each of the reactors and a pre-set half cycle time value for each of the reactors.

At block 604, the method 600 includes periodically sensing, using a plurality of sensors 504, a temperature of an exhaust gas at an outlet of each of a plurality of reactors of the hydride air conditioner and generating a current outlet temperature value at each of pre-defined time intervals for each of the rectors.

At block 606, the method 600 includes increasing a current time count value at each of the pre-defined time intervals immediately after switching on of said metal hydride air conditioner.

At block 608, the method 600 includes reading the pre-set outlet temperature value and the pre-set half cycle time from a memory.

At block 610, the method 600 includes iteratively receiving, using a controller 502, the current outlet temperature value, and the current time count value.

At block 612, the method includes controlling at least one actuator associated with each of the reactors based on the current outlet temperature value, the pre-set outlet temperature value, the pre-set half cycle time value, and the current time count value.

Figure 7:
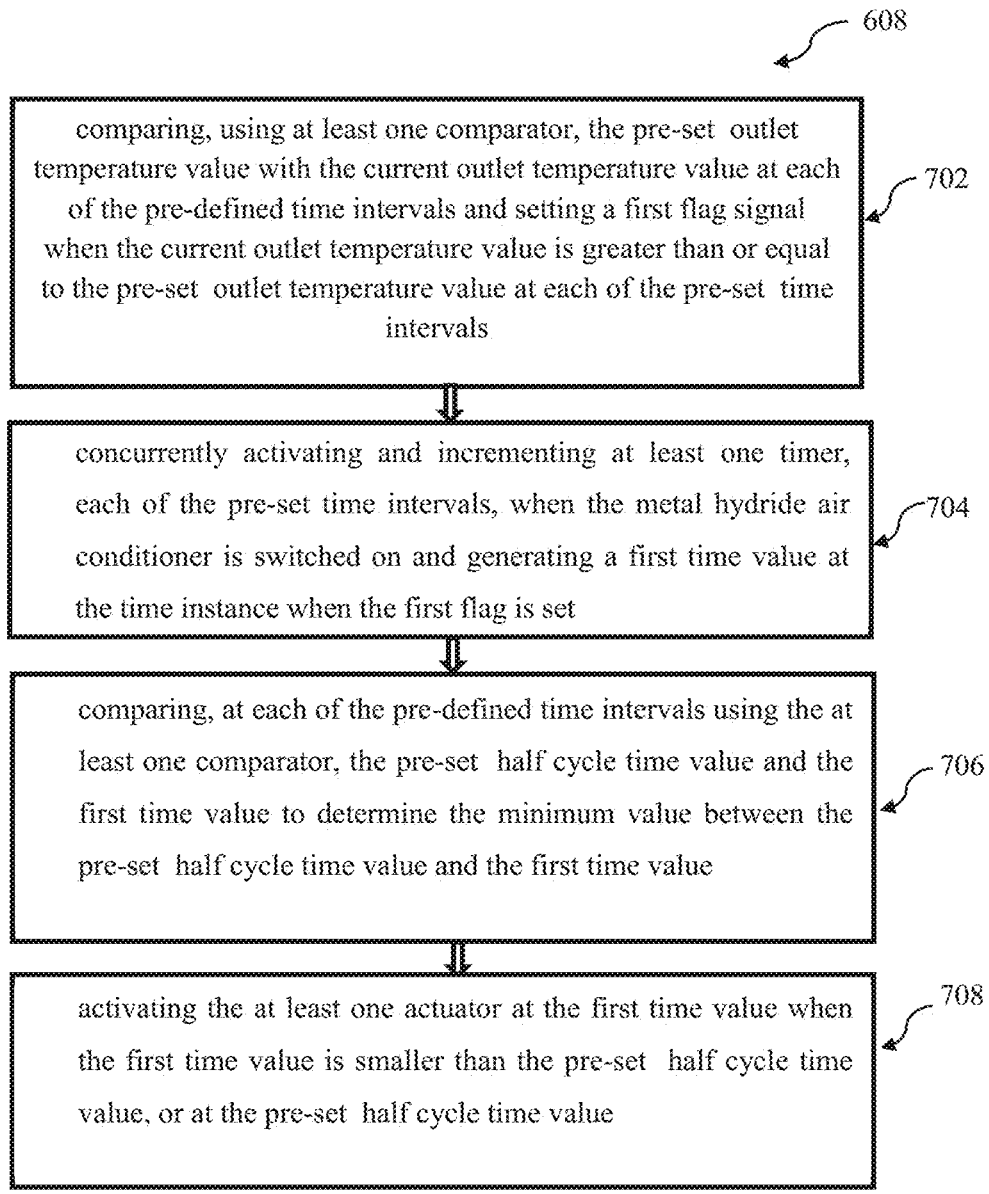
FIG. 7 illustrates a flow diagram of the method, for the steps of controlling actuation of at least one actuator, of FIG. 6.

In accordance with first embodiment of the present disclosure, the step of controlling at least one actuator associated with each of the reactors 612 includes the following sub-steps illustrated in FIG. 7:
  comparing, using at least one comparator (510), the pre-set outlet temperature value with the current outlet temperature value at each of the pre-defined time intervals and setting a first flag signal when the current outlet temperature value at each of the pre-set time intervals is greater than or equal to the pre-set outlet temperature value (702);
  concurrently activating and incrementing at least one timer (512), at each of the pre-set time intervals, when the metal hydride air conditioner is switched on and generating a first time value at the time instance when the first flag is set (704);
  comparing, at each of the pre-defined time intervals using the at least one comparator (510), the pre-set half cycle time value and the first time value to determine the minimum value between the pre-set half cycle time value and the first time value (706);
  activating the at least one actuator (514 or 516) at the first time value when the first time value is smaller than the pre-set half cycle time value, or at the pre-set half cycle time value (708).

Figure 8:
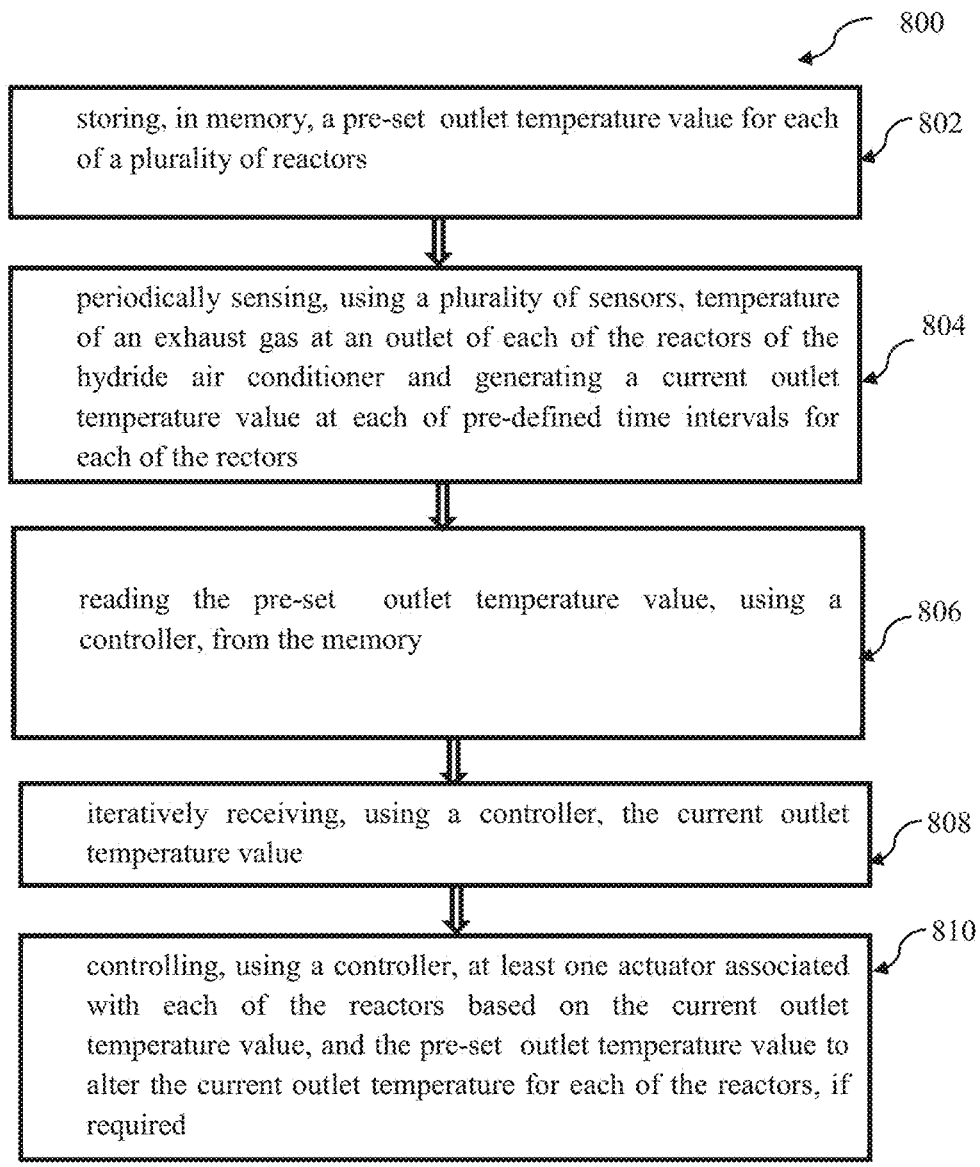
FIG. 8 illustrates a flow diagram of a method for controlling actuation of at least one actuator associated with each of a plurality of reactors of a metal hydride air conditioner in accordance with second embodiment of the present disclosure.

FIG. 8 illustrates a method 800 for controlling actuation of at least one actuator associated with each of a plurality of reactors of a metal hydride air conditioner in accordance with second embodiment of the present disclosure. FIG. 11 illustrates a flow chart depicting the method in accordance with the second embodiment of the present disclosure.

At block (step) 802, the method 800 includes storing, in memory (506), a pre-set outlet temperature value for each of the reactors.

At block 804, the method 800 includes periodically sensing, using a plurality of sensors (504), temperature of an exhaust gas at an outlet of each of the reactors of the hydride air conditioner and generating a current outlet temperature value at each of pre-defined time intervals for each of the rectors.

At block 806, the method 800 includes reading the pre-set outlet temperature value, using a controller (502), from the memory (506).

At block 808, the method 800 includes iteratively receiving, using a controller (502), the current outlet temperature value.

At block 810, the method 800 includes controlling, using a controller (502), at least one actuator (514 or 516) associated with each of the reactors based on the current outlet temperature value, and the pre-set outlet temperature value.

FIGS. 9A, 9B and 9C illustrate a method 900 for controlling actuation of at least one actuator associated with each of a plurality of reactors of a metal hydride air conditioner in accordance with third embodiment of the present disclosure.

At block (step) 902, the method 900 includes storing, in memory 506, a pre-set outlet temperature value for each of the reactors and a pre-set half cycle time lower limit value a the pre-set half cycle time upper limit value for each of the reactors.

At block 904, the method 900 includes periodically sensing, using a plurality of sensors 504, a temperature of an exhaust gas at an outlet of each of the reactors of the hydride air conditioner and generating a current outlet temperature value at each of pre-defined time intervals for each of the rectors.

At block 906, the method 900 includes increasing a current time count value at each of the pre-defined time intervals immediately after switching on of said metal hydride air conditioner.

At block 908, the method 900 includes reading the pre-set outlet temperature value, the pre-set half cycle time lower limit value and the pre-set half cycle time upper limit value from the memory.

At block 910, the method 900 includes iteratively receiving the current outlet temperature value, and the current time count value.

At block 912, the method 900 includes comparing, using at least one comparator (510), the pre-set outlet temperature value with the current outlet temperature value at each of the pre-defined time intervals and setting a second flag signal when the current outlet temperature value is equal to the pre-set outlet temperature value.

At block 914, the method 900 includes concurrently activating and incrementing the at least one timer (512), at each of the pre-defined time intervals, when the metal hydride air conditioner is switched on, and generating a second time value at the time instance when the second flag is set.

At block 916, the method 900 includes comparing, at each of the pre-defined time intervals using the at least one comparator (510), the pre-set half cycle time lower limit value, the pre-set half cycle time upper limit value, the current time count value, and the second time value.

At block 918, the method includes step of entering in a wait state when the current time count value is greater than or equal to the pre-set half cycle time lower limit value and the current time count value is smaller than the second time value or the pre-set half cycle time upper limit value; or the current time count value is greater than or equal to the second time value and the current time count value is smaller than the pre-set half cycle time lower limit value.

At block 920, the method includes step of activating the at least one actuator (514 OR 516) when the current time count value equals to either the second time value or the pre-set half cycle time upper limit value; or the current time count value is greater than or equal to the second time value and equals to the pre-set half cycle time lower limit value.

The control system and the methods, envisaged in the present disclosure, takes into consideration the pre-set half cycle time value as well as the outlet temperature values of the exhaust gases for changing the type of flow entering the reactors of the metal hydride air conditioner. Further, the control system 500 and the method 600 facilitates optimum operation of the air conditioner which results in improvement in cooling capacity and the coefficient of performance of the metal hydride air conditioner.

Technical Advancements

The present disclosure described herein above has several technical advantages including, but not limited to, the realization of a control system for a metal hydride air conditioner that:

improves the cooling capacity and coefficient of performance of the metal hydride air conditioner; and optimally changes the flow of various fluids to be supplied in reactors of the metal hydride air conditioner.

The disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. For example, the time counter (508) and the timer (512) may be integrated and the method of implementing it is obvious to a person skilled in the art and therefore, within the scope of the present disclosure.

The foregoing description of the specific embodiments so fully revealed the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A control system (500) for a metal hydride air conditioner, said system comprising:
    a plurality of sensors (504) configured to periodically sense temperature of an exhaust gas at an outlet of each of a plurality of reactors of said hydride air conditioner and generate a current outlet temperature value at each of pre-defined time intervals for each of said reactors;
    a memory (506) configured to store a pre-set outlet temperature value for each of said reactors and a pre-set half cycle time value for each of said reactors;
    a time counter (508), configured to increase a current time count value at each of the pre-defined time intervals immediately after switching on of said metal hydride air conditioner; and
    a controller (502) cooperating with said plurality of sensors (504), said memory (506), and said time counter (508), and configured to:
        a read said pre-set outlet temperature value and said pre-set half cycle time value from said memory,
        iteratively receive said current outlet temperature value, and said current time count value, and
        control at least one actuator (514 or 516) associated with each of said reactors based on said current outlet temperature value, said pre-set outlet temperature value, said pre-set half cycle time value, and said current time count value to alter said current outlet temperature for each of said reactors, as required.

2. The control system (500) as claimed in claim 1, wherein said controller (502) includes at least one comparator (510) and at least one timer (512).

3. The control system (500) as claimed in claim 1, wherein said controller (502) is further configured to:
    compare, using said at least one comparator (510), said pre-set outlet temperature value with said current outlet temperature value at each of the pre-defined time intervals and set a first flag signal when said current outlet temperature value is greater than or equal to said pre-set outlet temperature value;
    concurrently activate and increment said at least one timer (512), at each of the pre-defined time intervals, when said metal hydride air conditioner is switched on, and generate a first time value at the time instance when said first flag is set;
    compare, at each of the pre-defined time intervals using said at least one comparator (510), said pre-set half cycle time value and said first time value to determine the minimum value between said pre-set half cycle time value and said first time value, and activate said at least one actuator (514 or 516):
        at said first time value when said first time value is smaller than said pre-set half cycle time value, or
        at said pre-set half cycle time value.

4. The control system (500) as claimed in claim 1, wherein said controller includes at least one comparator (501), and said controller (502) is further configured to:
    compare, using said at least one comparator (510), said pre-set outlet temperature value with said current outlet temperature value at each of the pre-defined time intervals; and
    activate said at least one actuator (514 or 516) when said current outlet temperature value is greater than or equal to said pre-set outlet temperature value.

5. The control system (500) as claimed in claim 1, wherein said metal hydride unit includes:
    a high temperature reactor configured to receive a first fluid at ambient temperature or a hot fluid during the duration of a half-cycle of said high temperature reactor; and
    a low temperature reactor configured to receive said first fluid or a cold fluid during the duration of a half-cycle of said low temperature reactor.

6. The control system (500) as claimed in claim 1, wherein
    a first actuator (514) associated with said high temperature reactor is configured to direct a flow of said first fluid or said hot fluid towards said high temperature reactor; and
    a second actuator (516) associated with said low temperature reactor is configured to direct a flow of said first fluid or said cold fluid towards said low temperature reactor.

7. The control system (500) as claimed in claim 1, wherein said controller (502) is selected from the group comprising of at least one of a processor, a microcontroller, a microprocessor, an application specific integrated circuit (ASIC), Field Programmable Gate Array (FPGA) integrated circuit, a Reduced Instruction Set Computing (RISC) integrated circuit and any combinations thereof.

8. The control system (500) as claimed in claim 1, wherein said at least one actuator (514 or 516) associated with each of said reactors is selected from the group consisting of an electro-mechanical switch, a valve, a damper, a flap, and a motor.

9. A control system (500) for a metal hydride air conditioner, said system comprising:
    a plurality of sensors (504) configured to periodically sense temperature of an exhaust gas at an outlet of each of a plurality of reactors of said hydride air conditioner and generate a current outlet temperature value at each of pre-defined time intervals for each of the reactors;
    a memory (506) configured to store a pre-set outlet temperature value for each of said reactors; and
    a controller (502) cooperating with said plurality of sensors (504), and said memory (506), and configured to:
        read said pre-set outlet temperature value from said memory (506), iteratively receive said current outlet temperature value, and control at least one actuator (514 or 516) associated with each of said reactors based on said current outlet temperature value, and said pre-set outlet temperature value to alter said current outlet temperature for each of said reactors, as required.

10. A control system (500) for a metal hydride air conditioner, said system comprising:

a plurality of sensors (504) configured to periodically sense temperature of an exhaust gas at an outlet of each of a plurality of reactors of said hydride air conditioner and generate a current outlet temperature value at each of pre-defined time intervals for each of the reactors;

a memory (506) configured to store a pre-set outlet temperature value for each of said reactors, a pre-set half cycle time lower limit value for each of said reactors and a pre-set half cycle time upper limit value for each of said reactors;

a time counter (508) configured to increase a current time count value at each of the pre-defined time intervals immediately after switching on of said metal hydride air conditioner; and a controller (502) cooperating with said plurality of sensors (504), said memory (506), and said time counter (508), said controller (502) including at least one comparator (510) and at least one timer (512), and configured to:

read said pre-set outlet temperature value, said pre-set half cycle time lower limit value and said pre-set half cycle time upper limit value from said memory, iteratively receive said current outlet temperature value, and said current time count value, compare, using said at least one comparator (510), said pre-set outlet temperature value with said current outlet temperature value at each of the pre-defined time intervals and set a second flag signal when said current outlet temperature value is equal to said pre-set outlet temperature value;

concurrently activate and increment said at least one timer (512), at each of the pre-defined time intervals, when said metal hydride air conditioner is switched on, and generate a second time value at the time instance when said second flag is set; and compare, at each of the pre-defined time intervals using said at least one comparator (510), said pre-set half cycle time lower limit value, said pre-set half cycle time upper limit value, said current time count value, and said second time value to:

enter in a wait state when:
said current time count value is greater than or equal to said pre-set half cycle time lower limit value and said current time count value is smaller than said second time value or said pre-set half cycle time upper limit value; or
said current time count value is greater than or equal to said second time value and said current time count value is smaller than said pre-set half cycle time lower limit value; and activate said at least one actuator (514 OR 516) when:
said current time count value equals to either said second time value or said pre-set half cycle time upper limit value; or
said current time count value is greater than or equal to said second time value and equals to said pre-set half cycle time lower limit value to alter said current outlet temperature for each of said reactors, if required.

11. A method for controlling actuation of at least one actuator (514 or 516) associated with each of the reactors of a metal hydride air conditioner, said method comprising following steps:

periodically sensing, at each of the pre-defined time intervals, using a plurality of sensors (504), temperature of an exhaust gas at an outlet of each of a plurality of reactors of said hydride air conditioner and generating a current outlet temperature value at each of the pre-defined time intervals for each of the reactors;

storing, in a memory (506), a pre-set outlet temperature value for each of said reactors and a pre-set half cycle time value for each of said reactors;

increasing a current time count value at each of the pre-defined time intervals immediately after switching on of said metal hydride air conditioner;

reading, using a controller (502), said pre-set half cycle time value and said pre-set outlet temperature value from said memory;

iteratively receiving, using a controller (502), said current outlet temperature value and said current time count value; and controlling at least one actuator (514 or 516) associated with each of said reactors for altering the current outlet temperature for each of the reactors based on said current outlet temperature value, said pre-set outlet temperature value, said pre-set half cycle time value, and said current time count value.

12. The method as claimed in claim 11, wherein said step of controlling at least one actuator (514 or 516) includes following sub-steps:

comparing, using at least one comparator (510), said pre-set outlet temperature value with said current outlet temperature value at each of the pre-defined time intervals and setting a first flag signal when said current outlet temperature value is greater than or equal to said pre-set outlet temperature value;

concurrently activating and incrementing at least one timer (512) at each of the pre-defined time intervals, when said metal hydride air conditioner is switched on and generating a first time value at the time instance when said first flag is set;

comparing, using said at least one comparator (510), said pre-set half cycle time value and said first time value to determine the minimum value between said pre-set half cycle time value and said first time value; and activating said at least one actuator (514 or 516):
at said first time value when said first time value is smaller than said pre-set half cycle time value, or
at said pre-set half cycle time value.

13. A method for controlling actuation of at least one actuator (514 or 516) associated with each of the reactors of a metal hydride air conditioner, said method comprising the following steps:

storing, in memory (506), a pre-set outlet temperature value for each of a plurality of reactors;

periodically sensing, using a plurality of sensors (504), temperature of an exhaust gas at an outlet of each of said reactors of said hydride air conditioner and generating a current outlet temperature value at each of pre-defined time intervals for each of said reactors;

reading said pre-set outlet temperature value, using a controller (502), from said memory (506);

iteratively receiving, using a controller (502), said current outlet temperature value; and controlling, using a controller (502), at least one actuator associated with each of said reactors based on said current outlet temperature value, and said pre-set outlet temperature value to alter said current outlet temperature for each of said reactors, as required.

14. A method for controlling actuation of at least one actuator (514 or 516) associated with each of the reactors of a metal hydride air conditioner, said method comprising following steps, said method comprising the following steps:

storing, in a memory (506), a pre-set outlet temperature value for each of a plurality of reactors, a pre-set half cycle time lower limit value for each of said reactors, and a pre-set half cycle time upper limit value for each of said reactors;

periodically sensing, using a plurality of sensors (504), a temperature of an exhaust gas at an outlet of each of said reactors of said hydride air conditioner and generating a current outlet temperature value at each of pre-defined time intervals for each of said reactors;

increasing a current time count value at each of said pre-defined time intervals immediately after switching on of said metal hydride air conditioner;

reading said pre-set outlet temperature value, said pre-set half cycle time lower limit value and said pre-set half cycle time upper limit value from said memory;

iteratively receiving said current outlet temperature value, and said current time count value;

comparing, using at least one comparator (510), said pre-set outlet temperature value with said current outlet temperature value at each of said pre-defined time intervals and setting a second flag signal when said current outlet temperature value is equal to said pre-set outlet temperature value;

concurrently activating and incrementing said at least one timer (512), at each of said pre-defined time intervals, when said metal hydride air conditioner is switched on, and generating a second time value at the time instance when said second flag is set;

comparing, at each of said pre-defined time intervals using said at least one comparator (510), said pre-set half cycle time lower limit value, said pre-set half cycle time upper limit value, said current time count value, and said second time value;

entering in a wait state when:
said current time count value is greater than or equal to said pre-set half cycle time lower limit value and said current time count value is smaller than said second time value or said pre-set half cycle time upper limit value; or
said current time count value is greater than or equal to said second time value and said current time count value is smaller than said pre-set half cycle time lower limit value;

activating said at least one actuator (514 or 516) when:
said current time count value equals to either said second time value or said pre-set half cycle time upper limit value; or
said current time count value is greater than or equal to said second time value and equals to said pre-set half cycle time lower limit value.

* * * * *